United States Patent [19]

Hattori et al.

[11] Patent Number: 4,979,117
[45] Date of Patent: Dec. 18, 1990

[54] METHOD OF PROCESSING MALFUNCTION OF VEHICULAR ACCELERATION SENSOR

[75] Inventors: Toshihiro Hattori, Ayase; Masaki Ishihara, Fujisawa; Hitoshi Kasai, Kawasaki; Shigeki Moride, Yokosuka, all of Japan

[73] Assignee: Isuzu Motors, Limited, Tokyo, Japan

[21] Appl. No.: 402,871

[22] Filed: Sep. 5, 1989

Related U.S. Application Data

[63] Continuation of Ser. No. 70,118, Jul. 6, 1987, abandoned, which is a continuation of Ser. No. 686,545, Dec. 20, 1984, abandoned.

[51] Int. Cl.$^5$ ............................................. F02D 41/22
[52] U.S. Cl. ........................... 364/431.07; 364/431.11; 123/479; 123/494; 123/361; 123/399
[58] Field of Search ................ 364/431.11, 431.07, 364/431.05; 123/479, 494, 361, 399

[56] References Cited

U.S. PATENT DOCUMENTS

| | | | |
|---|---|---|---|
| 4,359,028 | 11/1982 | Fiala | 123/399 |
| 4,450,815 | 5/1984 | Mouri | 123/479 |
| 4,509,480 | 4/1985 | Kull et al. | 123/479 |
| 4,519,361 | 5/1985 | Murakami | 123/361 |
| 4,534,328 | 8/1985 | Fischer et al. | 123/479 |
| 4,566,418 | 1/1986 | Yamamoto et al. | 123/479 |

Primary Examiner—Parshotam S. Lall
Assistant Examiner—V. N. Trans
Attorney, Agent, or Firm—Staas & Halsey

[57] ABSTRACT

Herein disclosed is a method of processing a malfunction of an accelerator pedal sensor of an automobile. An output voltage is outputted according to changes in a resistance depending upon depression of an accelerator pedal. A malfunction of the accelerator pedal sensor is shot to process and determine an acceleration value for controlling the run of the automobile in accordance with said output voltage. The acceleration value is set at a predetermined value in accordance with the malfunction of either of an idle switch for generating a signal indicating the idle position of the accelerator pedal and a wide-open switch for generating a signal indicating the wide open position of the accelerator pedal when the malfunction of the accelerator pedal sensor is judged. This judgement is conducted by detecting a plurality of times that said output voltage is outside of the predetermined voltage range. The acceleration value is set at a predetermined minimum value, when the idle switch is in a normal state, at a predetermined relatively high value, when the wide-open switch is in a normal state, and at a predetermined relative low value when both the two switches are troubled.

6 Claims, 5 Drawing Sheets

METHOD OF PROCESSING MALFUNCTION OF VEHICULAR ACCELERATION SENSOR

This is a continuation of co-pending application Ser. No. 07/070,118 filed on Jul. 6, 1987, now abandoned which is a continuation of Ser. No. 06/686,545 filed on Dec. 20, 1984, abandoned.

BACKGROUND OF THE INVENTION

1. Field of the Invention

The present invention relates to a method of processing the malfunction of an acceleration sensor such as an accelerator pedal sensor of a motor vehicle such as an automobile and, more particularly, to a method of detecting the malfunction of the accelerator pedal sensor, which is made operative to output an electric signal indicating the depression of the accelerator pedal, to cope with the malfunction.

2. Description of the Prior Art

In recent years, introduction of the electronic technique into control of the motor vehicle is so outstanding that a variety of mechanically controlled parts are replaced by electronically controlled ones. In order to use this electronic control, displacements or the like of the respective parts have to be converted into electric signals, and therefore sensors are used with those parts. Of these, for example, an accelerator pedal sensor is used with the accelerator pedal so as to detect driver's actuation or depression of the pedal.

Despite of this fact, however, the accelerator pedal sensor cannot be completely free from trouble or failure. If this trouble occurs during the operation of the motor vehicle, it raises a serious danger because the vehicle is controlled by controlling an engine and so on with the output signal of the accelerator pedal sensor.

SUMMARY OF THE INVENTION

It is, therefore, a major object of the present invention is to provide a method of detecting the malfunction, if any, of an accelerator pedal sensor, while a motor vehicle is running, and to cope with the danger which might otherwise trouble the operation of the vehicle.

In the method according to the present invention, a malfunction of an accelerator pedal sensor, composed of a potentiometer, is judged when its output voltage falls outside of a predetermined voltage range, and a predetermined value is generated as a pseudo acceleration value for controlling the operation of an automobile is generated in accordance with the state of status of an idle switch and a wide-open switch when the malfunction of the accelerator pedal sensor is judged.

According to one feature of the present invention a method of processing a malfunction of an acceleration sensor of a motor vehicle, comprises the steps of: outputting an output voltage according to changes in a resistance depending upon actuation of an accelerator; determine an acceleration value for controlling the run detecting that said output voltage falls outside of a predetermined voltage range, to judge the malfunction of said acceleration sensor; detecting a malfunction of an idle switch for generating a signal indicating the idle position of said accelerator; detecting a malfunction of a wide-open switch for generating a signal indicating the wide open position of said accelerator; and setting said acceleration value at a predetermined value in accordance with the malfunction of at least one of said idle switch and said wide-open switch detected when the malfunction of said acceleration sensor is judged.

BRIEF DESCRIPTION OF THE DRAWINGS

Other objects, features and advantages of the present invention will become apparent from the following description taken in conjunction with the embodiment thereof with reference to the accompanying drawings, in which.

DESCRIPTION OF THE PREFERRED EMBODIMENT

Figure 1:
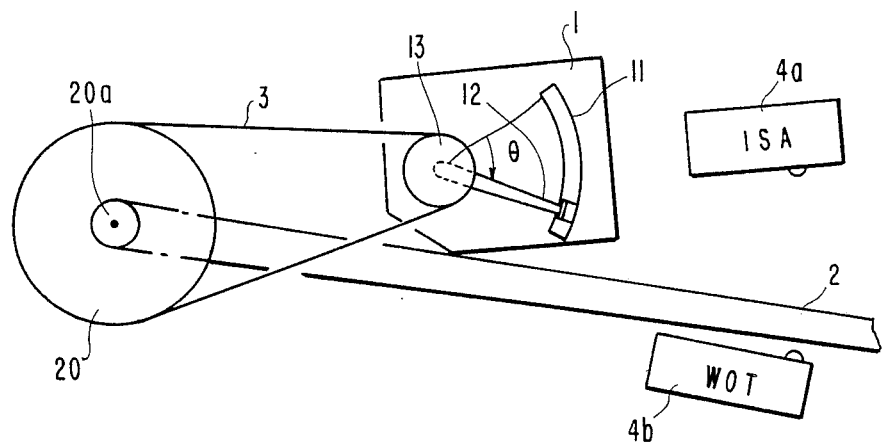
FIG. 1 is a schematic view showing the construction of an accelerator pedal sensor to be used with a method of processing the malfunction of the accelerator pedal sensor in accordance with the present invention.

With reference to FIG. 1, there is fixed on a shaft 20a of an accelerator pedal 2 a pulley 20, which drives an acceleration sensor 1. This sensor 1 is constructed of a potentiometer which is having a fixed resistance 11 and a sliding contact 12. This sliding contact 12 is fixed on a shaft (not-numbered) of a pulley 13 so that it is caused to slide on the fixed resistance 11 when the rotation of the pulley 20 is transmitted to the pulley 13 through an endless belt 3. Such a potentiometer is widely used because of its high resolution and low production cost, and because it can meter the depression (i.e., deflection) of the accelerator pedal 2 in terms of an electric signal such as an output voltage. Indicated at reference character 4a is an idle switch which is positioned above the accelerator pedal 2 so that it is turned on when the pedal 2 is released, thereby detecting the idling state. Indicated at character 4b is a wide open throttle switch ("WOT") which is positioned below the accelerator pedal 2 so that it is turned on when the pedal 2 is depressed to its maximum stroke. Thus, the accelerator pedal 2 can be depressed or deflected between the two switches 4a and, 4b so that the sliding contact 12 is deflected or rotated by an angle $\theta$ in proportion to the ratio between the diameters of the pulleys 20 and 13.

Incidentally, the sliding contact 12 may be connected directly to the shaft 20a of the accelerator pedal 2 so that it may be deflected as the shaft 20a rotates.

In response to the outputs of the two switches 4a and 4b of the accelerator pedal sensor 1, a control unit determines the degree of acceleration to control the throttle valve of an engine and the actuation of a clutch, and to determine the appropriate gear position, as will be described in detail.

Figure 2:
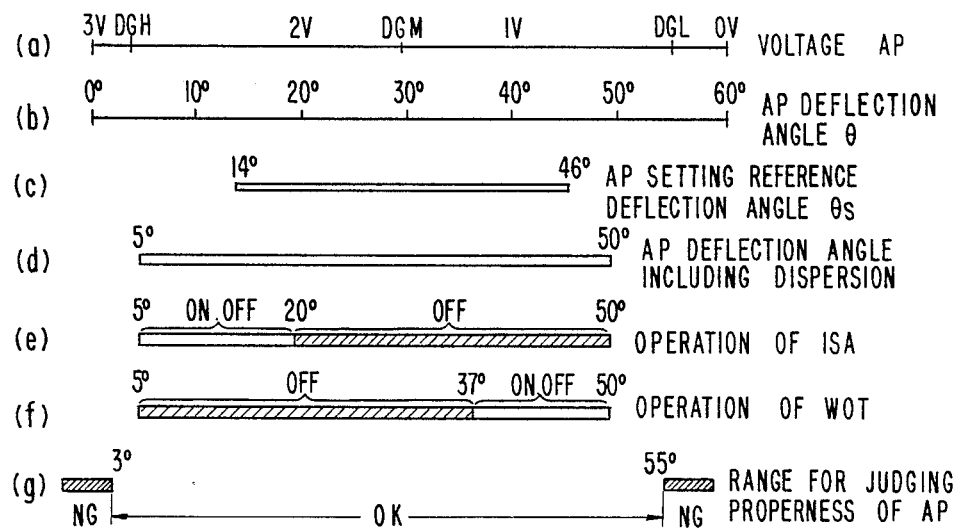
FIG. 2 is a diagram for explaining references for judgements to be made in the method according to the present invention.

FIG. 2 is a diagram for explaining conditions for judging the malfunction of the accelerator pedal sensor 1. The sliding contact 12 of the accelerator pedal sensor (referred to as "AP") is so set that it can be deflected or rotated by an angle $\theta$ of 0 to 60 degrees, as shown in FIG. 2(b). For this AP deflection angle $\theta$, the voltage AP is set at a level from 0 to 3 V, as shown in FIG. 2(a). An AP setting reference deflection angle $\theta_s$, which is used in practice, is set at 14 to 46 degrees, as shown in FIG. 2(c).

The acceleration idle switch ("ISA") 4a is so positioned that it is turned on during an idling, turned on and off within a range of 5 to 20 degrees of the deflection angle θ of the AP1, and turned off within a range of 20 to 50 degrees. On the other hand, the acceleration wide open switch 4b is so positioned that it is turned on during a wide open operation (in which the accelerator pedal 2 is depressed to its maximum stroke), turned off within a range of 5 to 37 degrees of the deflection angle θ of the AP1, and turned on and off within a range of 37 to 50 degrees, as shown in FIG. 2(f).

As a result of these settings, in a normal case, no output voltage is generated at the deflection angle θ of AP1 equal to or lower than 5 degrees, or equal to or greater than 50 degrees, as shown in FIG. 2(d). It is judged that the AP1 is shorted for the deflection angle θ equal to or smaller than 3 degrees but is opened for the angle θ equal to or larger than 55 degrees, as shown in FIG. 2(g).

In other words, it is determined that there is a short circuit if the output voltage AP of AP1 is equal to or lower than a minimum reference voltage DGL (i.e., 0.15 V) corresponding to the deflection angle 0 of 3 degrees, whereas it is determined that there is an open circuit if the output voltage AP is equal to or higher than a maximum reference voltage DGH (i.e., 2.75 V), corresponding to the deflection angle 0 of 55 degrees, as seen from FIG. 2(a).

Figure 3:
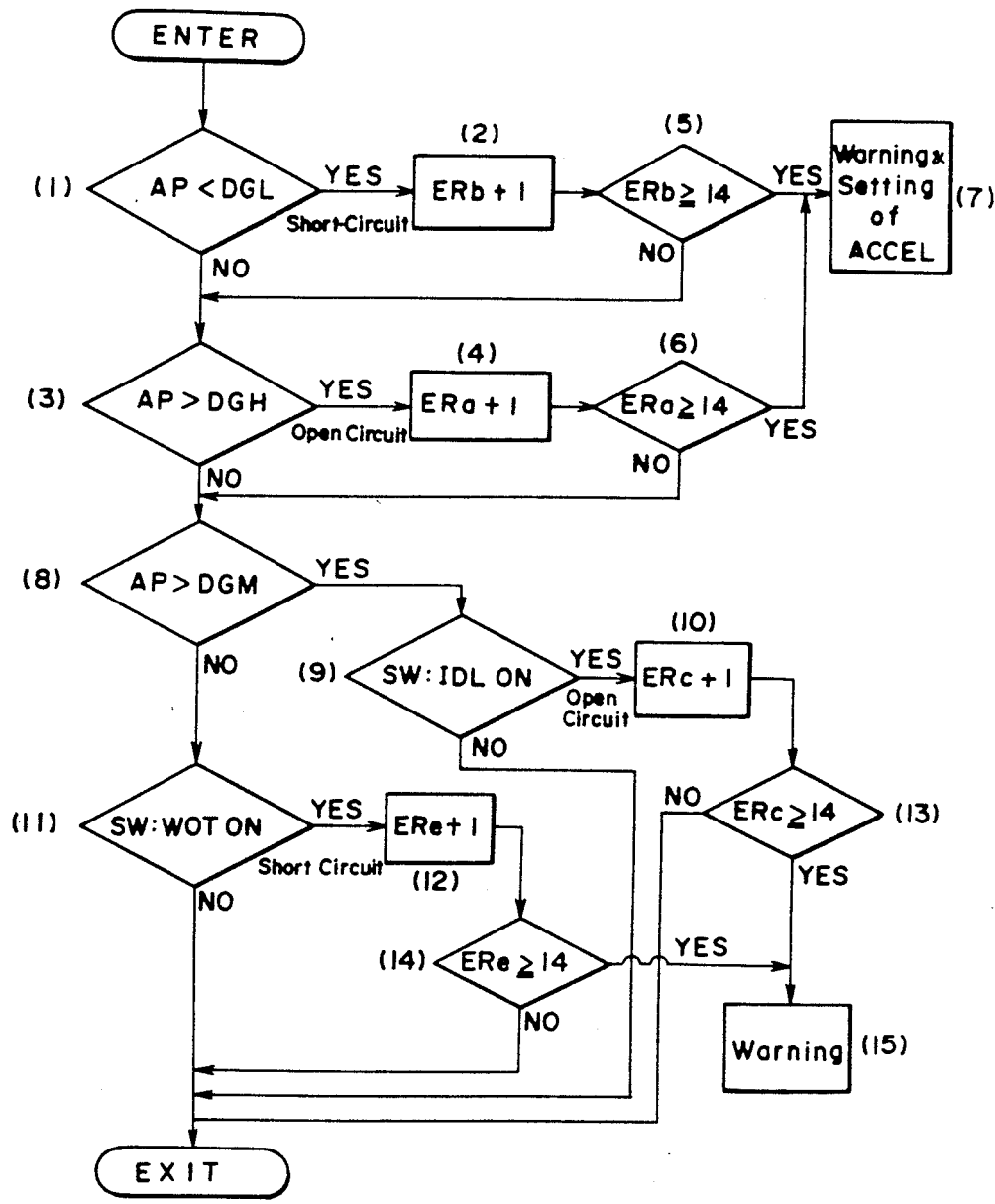
FIG. 3 is a flow chart for explaining the principle of the method of the present invention.

FIG. 3 is a flow chart showing the malfunction processing according to the principle of the method of the present invention on the basis of the references for judgements of FIG. 2. The output voltage AP of the accelerator pedal sensor 1 is compared with the minimum reference voltage DGL (as at a step (1)). If AP<DGL, the circuit is judged to be shorted, and an error counter value $ER_b$ is incremented by 1 (as at a step (2)). Next, the output voltage AP of the accelerator pedal sensor 1 is compared with the maximum reference voltage DGH (as at a step (3)). If AP>DGH, the circuit is judged to be open, and an error counter value $ER_a$ is incremeted by 1 (as at a step (4)). If either of the error counter values $ER_a$ or $ER_b$ exceeds a predetermined value (e.g., 14) (as at a step (5) or (6)), a warning of the sensor malfunction is sent out (as at a step (7)), and an acceleration value ACCEL is set in such a manner as will be described hereinafter. In other words, an erroneous inspection is prevented by not judging the malfunction before it is found that the shorted or opened state has continued for a predetermined time period (or at a predetermined number of repetitions).

Moreover, it is possible to detect the malfunction of the idle switch 4a or the WOT switch 4b. For this detection, a voltage (e.g., 1.5 V) corresponding to a predetermined deflection angle θ (e.g., 30 degrees) falling within the range in which the two switches 4a and 4b of FIG. 2 never fail to be turned on, is set at an intermediate reference voltage DGM, with which the output voltage AP is compared (as at a step (8)). If AP>DGM, it is determined (as at a step (9)) whether the idle switch 4a is turned on or off. Since, in this range of the output voltage AP, the idle switch 4a is always off if the circuit is normal, the circuit is judged to be open if the idle switch 4a is on, and an error counter value $ER_c$ is incremented by 1 (as at a step (10)). For AP<DGM (at the step (8)), on the contrary, it is determined (as at a step (11)) whether the WOT switch 4b is turned on or off. Since, in this range of the output voltage AP, the WOT switch 4b is always off if the circuit is normal, the circuit is judged to be shorted if the WOT switch 4b is on, and an error counter value $ER_e$ is incremented by 1 (as at a step (12)). If either of the error counter value $ER_c$ or $ER_e$ exceeds a predetermined value (e.g., 14) (as at a step (13) or (14)), a warning of the malfunction of the corresponding switch 4a or 4b is sent out (as at a step (15)).

Figure 4:
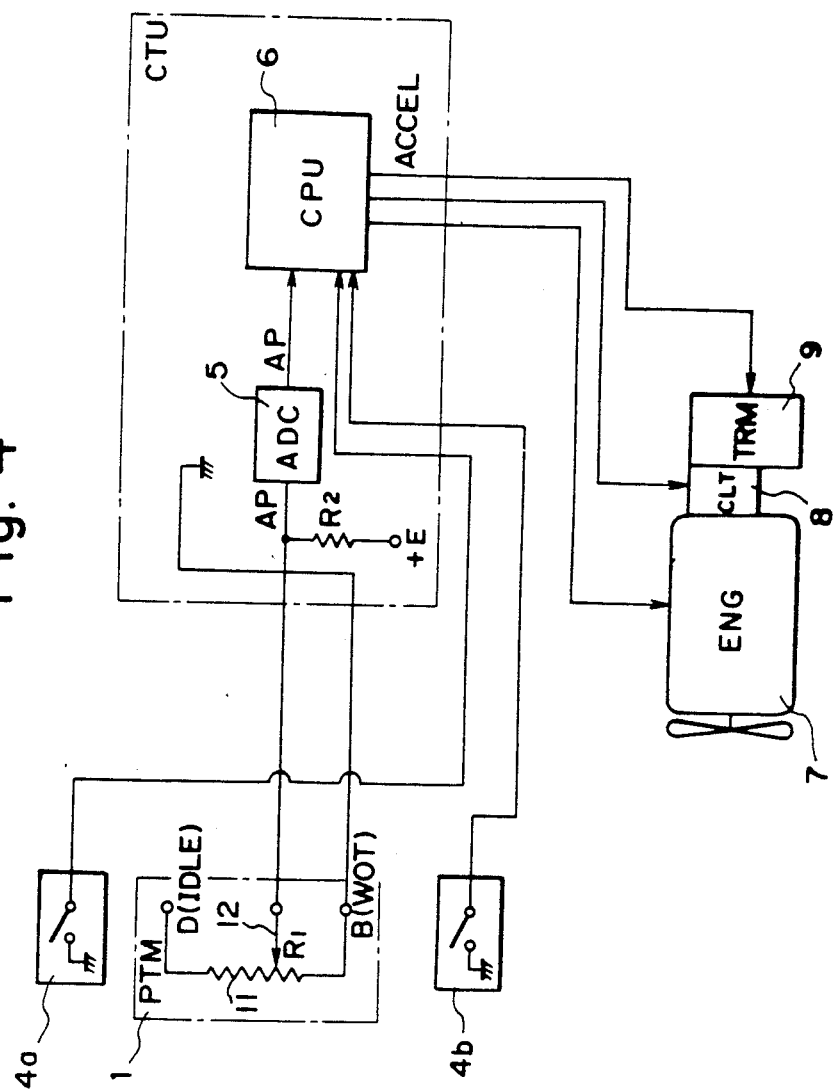
FIG. 4 is a circuit diagram showing, partially in a block form, a system for performing the method of the present invention.
Figure 5:
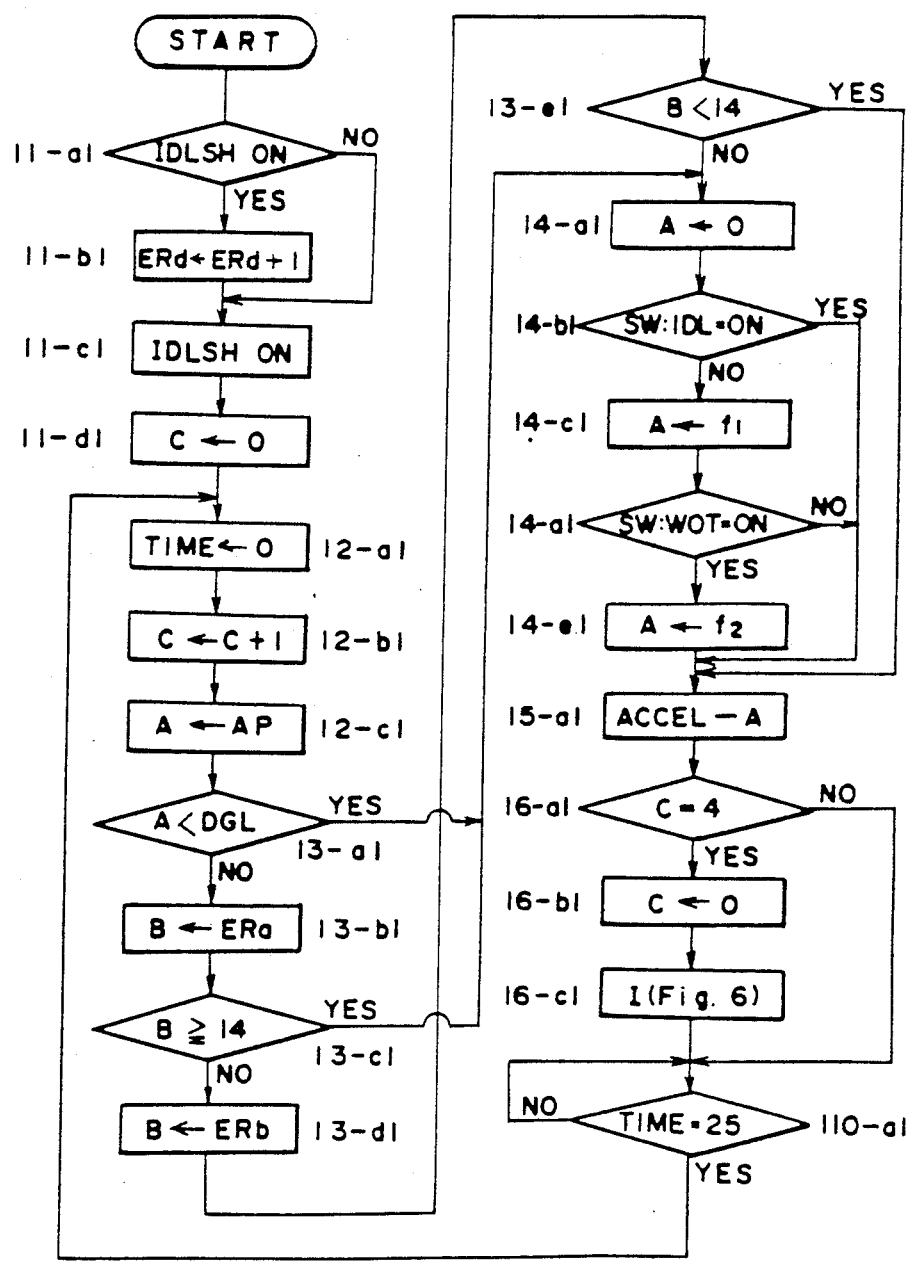
FIGS. 5 and 6 are flow charts showing the steps of the method according to one embodiment of the present invention.
Figure 6:
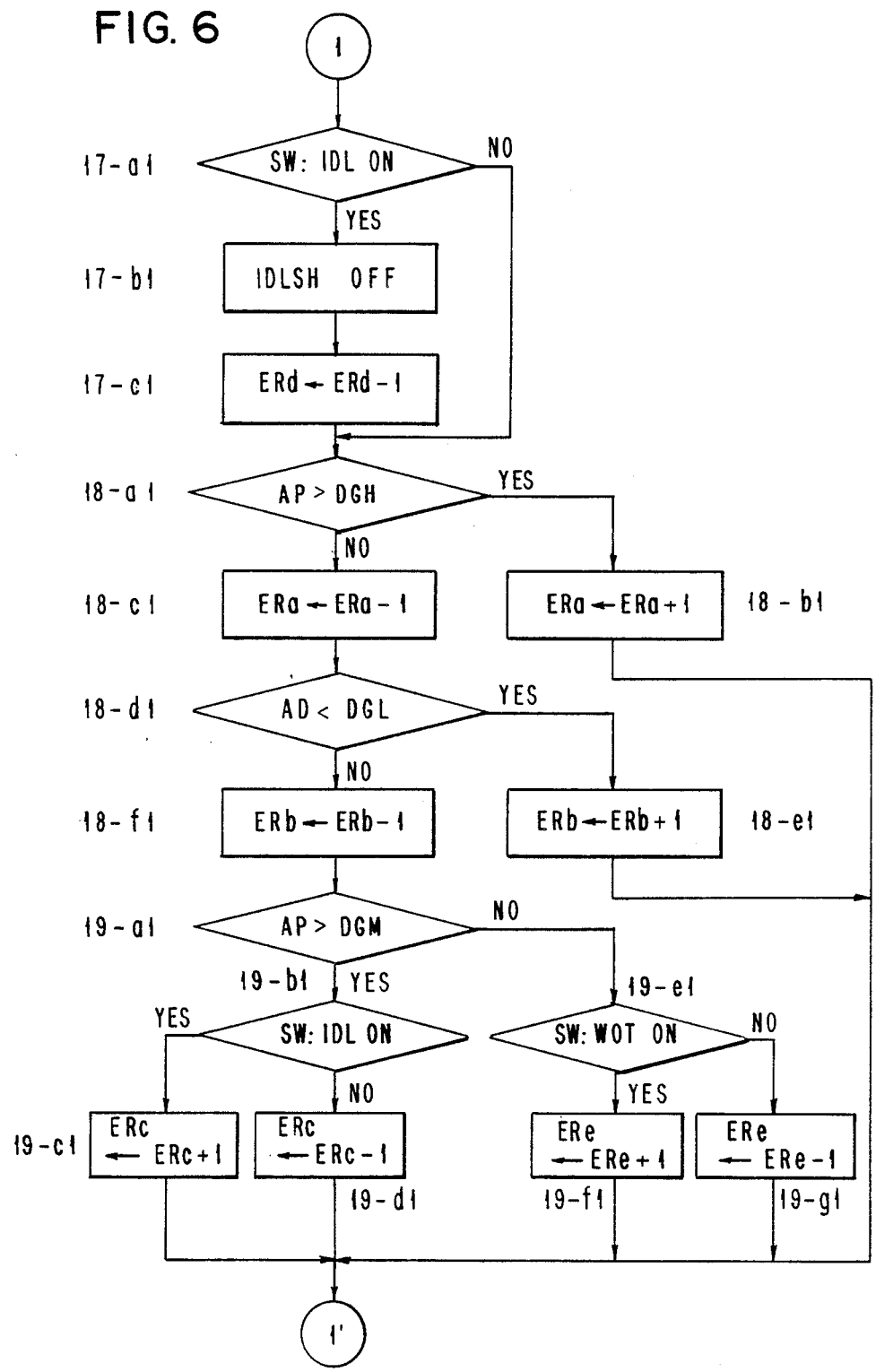

FIG. 4 is a circuit diagram showing, partially in a block form, a system for performing the method of the present invention, and FIGS. 5 and 6 are flow charts showing the steps of the method according to one embodiment of the present invention.

As shown in FIG. 4, the sensor 1 has its fixed resistance 11 (or Rl) opened at its idle terminal D (IDLE) and connected to the ground at a terminal B (WOT) so that it is connected with the control unit CTU through two lines. As a result, the maximum resistance, i.e., the maximum output voltage is attained at the idle terminal D (IDLE) whereas the minimum resistance, i.e., the minimum output voltage is attained at terminal B (WOT). On the other hand, the sliding contact 12 is connected with a power supply E through a resistance R2 having a resistance at least ten times as large as that of the resistance 11 (or Rl). And, the divided voltage AP according to the position of the sliding contact 12 of the sensor 1 is converted into a digital value AP by the action of an analog-digital converter ("AD converter") of a control unit CTU so that the digital voltage AP is inputted to a processor (i.e., a central processing unit) 6. This processor 6 utilizes the digital voltage AP as the acceleration signal to determine the control of the throttle opening of an internal combustion engine (ENG) 7, or to apply or release a clutch (CLT) 8, or to time the speed change of an automatic transmission (TRM) 9, thus controlling the engine 7, the clutch 8 and the transmission 9.

Now, the processor 6 of the control unit CTU processes the malfunction of the sensor 1 by using the output voltage AP of the sensor 1. This processing operation will be described with reference to FIGS. 5 and 6. Incidentally, the processor 6 is equipped with built-in memories to conduct a variety of arithmetic processing steps |1| to |10|.

|1|: The processor 6 first discriminates whether a judging flag ("IDLSH") the memory for detecting a short-circuit of the idle switch 4a is on (i.e., "1") or off (as at a substep |1-a|). If the flag is on, an idle switch short-circuit detecting error counter value $ER_d$ is incremented by 1 (as at a substep |1-b|). After this and if the judging flag is off, this flag is turned on (as at a substep |1-c|). More specifically, since it is impossible to detect the short-circuit of the idle switch 4a if the accelerator pedal 2 has been depressed before the key switch of the motor vehicle is turned on, the processings are started assuming that the short-circuit has been detected in advance, and the flag is turned off after the idle switch 4a is turned on (as referred to in step |7|). Moreover, the value C of a counter in the CPU, which operates during the inspection, is cleared (as at a substep |1-d|), thus ending the initializing step |1|.

|2|: Next, the processor 6 sets the value TIME of a program timer in the CPU to zero (as at a substep |2-a|), and the timer is started. And, the counter value C is incremented by 1 (as at a substep |2-b|). Moreover, the processor 6 sets a digital output voltage corresponding to AP in an accumulator ACC in the CPU (as at a substep |2-c|). Incidentally, in the construction of FIG. 4, since the digital output voltage AP has a maximum value at the idle terminal, a calculation of A=(25-5−AP) is conducted so that the output voltage AP has a minimum value at the idle terminal, and the calculated value A is set in the accumulator ACC.

|3|: The processor 6 compares the voltage A (which corresponds to AP) of the accumulator A with the minimum reference voltage DGL (as at a substep |3-a|). If A≧DGL, the processor 6 judges that the sensor is not short-circuited, and advances to a comparison of the voltage A and the maximum reference voltage DGH. If A≧DGL, the processor 6 sets the sensor open-circuit detecting error counter value $ER_6$ in an accumulator BCC as a counter value B (as at a substep |3-b|), and compares the counter value B (which is now set at $ER_6$) of the accumulator B with the set number "14" (as at substep |3-c|). If B≧14, the processor 6 judges that the sensor has its circuit opened, and advances to the step |4|. If B<14, on the contrary, the processor 6 proceeds to compare the voltage A with the maximum reference voltage DGH (as at substep 3-d). If A<DGH the processor advances to step 5. It A≧DGH the processor sets the sensor open-circuit detecting error counter value $ER_a$ in the accumulator BCC as the counted value B (as at a substep |3-e|), and compares the value BCC (which is now set at $ER_b$) of the accumulator B with the set number "14" (as at a substep |3-f|). If B<14, it is not yet determined that the sensor is short-circuited and the processor 6 advances to step |5|.

|4|: If B≧14, when B is set at $ER_a$ the sensor has an open circuit. Hence, the processor 6 sets the output voltage AP of the accumulator ACC at zero (as at a substep |4-a|). Next, the processor 6 detects the state of the idle switch 4a (as at a substep |4-b|). If the switch 4a is turned on, the processor 6 advances to the subsequent step |5|. If the switch 4a is turned off, on the contrary, the processor 6 sets the value A of the accumulator ACC at $f_1$ (i.e.. one eighth of the maximum depression) (as at a substep |4-c|). Next, the processor 6 detects the state of the WOT switch 4b (as at a substep |4-d|). If the switch 4b is off, the processor 6 advances to step |5|. If the switch 4b is on, on the contrary, the processor 6 sets the value A of the accumulator ACC at $f_2$ (i.e., one fourth of the maximum depression) (as at a substep |4-e|).

|5|: Next, the processor 6 sets the value A of the accumulator ACC at the acceleration value ACCEL (as at a substep |5-a|).

More specifically, when a malfunction is judged at the step |3|, as has been described above, the acceleration value ACCEL (which is the value A of the accumulator ACC) is set at zero (i.e., the minimum set value) if the idle switch 4a is on, to presume that the accelerator pedal 2 is in its idle position irrespective of the output of the sensor 1. If both the idle switch 4a and the WOT switch 4b are off, on the other hand, the acceleration value ACCEL is set at the value $f_1$ (i e., the intermediate set value). If the WOT switch 4b is on, on the other hand, the acceleration value ACCEL is set at the value $f_2$ (i.e., the maximum set value). If the sensor 1 is not troubled by having its circuit shorted or opened, moreover, the foregoing step |4| is not executed so that the output voltage AP of the sensor 1 is used as the acceleration value ACCEL. The acceleration value ACCEL thus determined is used by the processor 6 to control the throttle valve of the engine 7, to determine the speed change of the transmission 9 and so on, as shown in FIG. 4.

|6|: Next, the processor 6 detects whether the counter value C has the value "4" or not (as at a substep |6-a|). If C=4, the processor 6 drops the counter value C to zero (as at a substep |6-b|), and advances to a route I for detecting the following short-circuit and open-circuit (as at a substep |6-c|), as will be described with reference to FIG. 6. In other words, the detection of whether the circuit is shorted or opened is conducted once every four trials. If C≠4, on the contrary, the processor 6 advances to the later step |10|.

|7|: Next, the processor 6 advances to the route of FIG. 6 to detect the state of the idle switch 4a and to inspect whether the switch 4a is on or off (as at a substep |7-a|). If the switch 4a is on, the processor turns off (i.e., "0") the judging flag IDLSH (as at a substep |7-b|), which has been described in connection with the preceding step 1, and decreases the error counter value $ER_d$ by "1" (as at a substep |7-c|).

|8|: When the switch 4a is off and after the afore-mentioned decrement of "1", the processor 6 compares the output voltage AP with the maximum reference voltage DGH (as at a substep |8-a|). If AP>DGH, the processor 6 judges that the sensor 1 has its circuit opened, and increments the error counter value $ER_a$ by "1" (as at a substep |8-b|). Then, the processor 6 escapes this route and advances to the later step |10|. If AP≦DGH, on the contrary, the processor 6 judges that the sensor 1 does not have its circuit opened, and decreases the error counter value $ER_a$ by "1" (as at a substep |8-c|). Then, the processor 6 compares the output voltage AP with the minimum reference voltage DGL (as at a substep |8-d|). If AP<DGL, the processor 6 judges that the sensor 1 has its circuit shorted, and increments the error counter value $ER_b$ by "1" (as at a substep |8-e|). Then, the processor 6 escapes this route and advances to the later step |10|. If AP≦DGL, on the contrary, the processor 6 judges that the sensor 1 does not have its circuit shorted, and decreases the error counter value $ER_b$ by "1" (as at a substep |8-f|).

|9|: Next, the processor 6 advances to the step of detecting malfunctions of the switches 4a and 4b. The processor 6 compares the output voltage AP with the intermediate reference voltage DGM (as at a substep |9a|). If AP>DGM, the processor 6 detects whether the idle switch 4a is on or off (as at a substep |9-b|). If the switch 4a is on, the processor judges that the switch 4a has its circuit opened, and increments the error counter value $ER_c$ by "1" (as at a substep |9-c|). If the switch 4a is off, it is not opened so that the processor decrements the error counter value $ER_c$ by "1" (as at a substep |9-d|). Then, the processor 6 escapes this route and advances to the subsequent step |10|. If AP≦DGM, on the contrary, the processor 6 detects whether the WOT switch 4b is on or off (as at a substep |9-e|). If this switch 4b is on, the processor 6 judges that the switch 4b is short-circuited, and increments the error counter value $ER_e$ by "1" (as at a substep |9-f|). If the switch 4b is off, it is not short-circuited so that the processor 6 decreases the error counter value $ER_e$ by "1" (as at a substep |9-g|). Then, the processor escapes this route and advances to the subsequent step |10|.

|10|: Next, the processor 6 detects whether or not the timer value TIME has reached a value 25 (ms) (as at a substep |10-a|). If TIME=25, the processor 6 returns to the preceding step |2|.

As a result, the signal processing route of FIG. 5 is executed at each 25 ms, and the trouble shooting route of FIG. 6 is executed at each 100 ms (i.e., 4×25 ms). If a short-circuit or an open-circuit in the accelerator sensor is detected fourteen times by the the trouble shooting route of FIG. 6, namely, continues for 1.4 sec (14× 100 ms), moreover, the malfunction is judged by the route of FIG. 5 so that a pseudo signal for backing up the accelerator pedal sensor 1 is generated.

In the route of FIG. 5, incidentally, the warning of the malfunction is separate route (not shown) when B=≧14 and is displayed either on a display panel of a dashboard or on a separate inspection device. Moreover, the respective judging counters are subjected neither to any decrease after their values become 0 nor to any increment above a suitable value of 5 or more, (e.g., 14) although this feature is not specified in the flow charts.

As has been described hereinbefore, according to the present invention, the malfunction is judged by detecting on condition that the output voltage of the accelerator pedal sensor, constructed of a potentiometer, falls outside of the predetermined voltage range. As a result, it is possible to trouble-shoot the accelerator pedal sensor during the operation of the motor vehicle. Since the predetermined value is generated as the acceleration value in accordance with the states of the idle switch and the wide-open switch when the malfunction is judged, moreover, the acceleration value to be backed up can be set at the most proper value in accordance with the state of the untroubled normal switch so that the vehicle speed can be smoothly reduced to drive the vehicle to a safe area.

What is claimed is:

1. A method of processing a malfunction of an acceleration sensor of a motor vehicle, comprising the steps of:
    (a) outputting an output voltage according to changes in a resistance depending upon actuation of an accelerator;
    (b) detecting that said output voltage falls outside of a predetermined voltage range, to judge the malfunction of said acceleration sensor;
    (c) determining whether said accelerator is in an idle position or not based on a signal from an idle switch for detecting the idle position of said accelerator;
    (d) determining whether said accelerator is in a wide-open position or not, based on a signal from a wide-open switch for detecting the wide open position of said accelerator; and
    (e) setting an acceleration value at a predetermined value dependent on the position of said accelerator based on the signals from said idle switch and said wide-open switch when the malfunction of said accelerator is detected.

2. A method according to claim 1, wherein step (e) includes judging the malfunction of said acceleration sensor by detecting that said output voltage is determined to be outside of said predetermined voltage range a predetermined number of times.

3. A method according to claim 1, wherein step (e) includes setting said acceleration value at a predetermined minimum value when said wide-open switch is detected to be in a normal state, at a predetermined relatively high value when said wide-open switch is detected to be in a normal state, and at a predetermined relatively low value when the malfunctions of both said idle switch and said wide-open switch are detected.

4. A method according to claim 1, further comprising the step of generating a warning when a malfunction of said acceleration sensor is judged in step (b).

5. A method according to claim 1, further comprising the step of generating a warning when a malfunction of at least one of said idel switch and said wide-open switch is detected in steps (c) and (d).

6. A method for processing a malfunction of an accelerator sensor in a motor vehicle, comprising the steps of:
    (a) generating an output voltage having a voltage level corresponding to the degree of actuation of an accelerator pedal;
    (b) comparing the output voltage with a predetermined minimum reference voltage;
    (c) incrementing the stored count value of a first error counter in response to the comparison result that the output voltage is less than the predetermined minimum reference voltage;
    (d) comparing the output voltage with a redetermined maximum reference voltage;
    (e) incrementing the stored count value of a second error counter in response to the comparison result that the output voltage is greater than the predetermined maximum reference voltage;
    (f) determining that the accelerator sensor has malfunctioned if at least one of the error counter values exceeds a predetermined value;
    (g) determining whether the accelerator is in an idle position or not based on a signal from the idle position indication signal means for detecting the idel position of the accelerator;
    (h) determining whether the accelerator is in a wide open position or not, based on a signal from wide open signal means for detecting the wide open position of the accelerator; and
    (i) setting the acceleration value at a predetermined value dependent on the position of the accelerator based on the signals from said idel signal means and said wide open signal means when the malfunction of said accelerator sensor is detected.

* * * * *